June 8, 1948.  R. R. PITTMAN ET AL  2,443,117
CAPACITOR CONTROL SYSTEM
Filed May 13, 1944
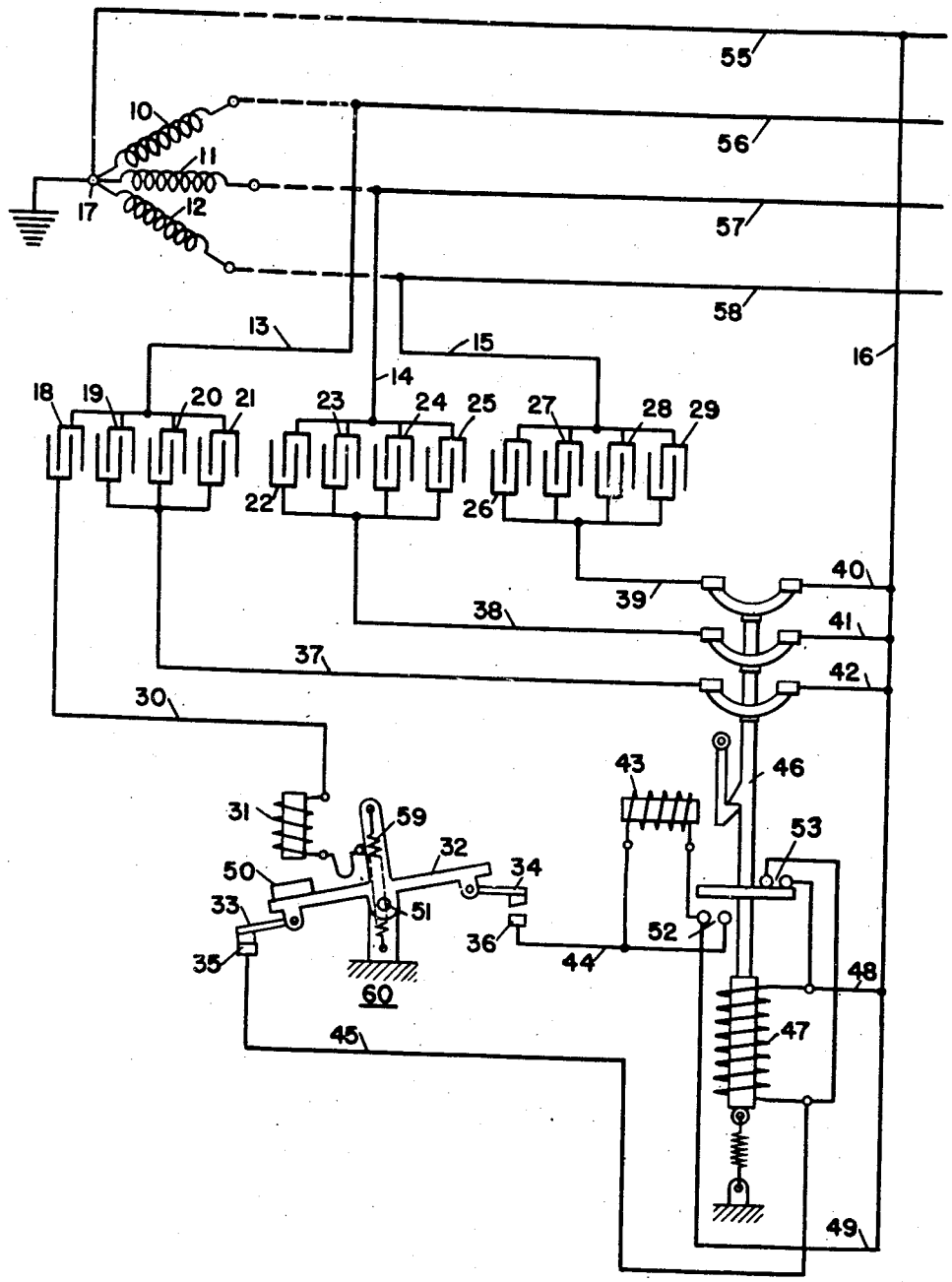
INVENTORS
Ralph R. Pittman
Paul J. Whitmore Patented June 8, 1948

2,443,117

UNITED STATES PATENT OFFICE 2,443,117

CAPACITOR CONTROL SYSTEM

Ralph R. Pittman and Paul G. Whitmore,
Little Rock, Ark.

Application May 13, 1944, Serial No. 535,514

9 Claims. (Cl. 323—128)

This invention relates to alternating current electrical systems having associated therewith capacitors for the purpose of controlling certain electrical conditions by connecting and disconnecting capacitors in accordance with predetermined changes in electrical conditions.

Capacitors have been and are currently used in connection with primary alternating current circuits for the purpose of improving power factor and voltage conditions when the associated circuit is heavily loaded. During light load periods, such as from midnight to 8 a. m. on week days, and Sundays when industrial load is relatively small, the capacitors, if effective during heavy load hours, cause excess voltage on the connected circuit. For this reason, some means of switching the capacitors on and off is desirable. Heretofore capacitor switching arrangements have included a primary oil circuit breaker interposed between the primary conductors and the capacitors, together with either a time-clock switch or voltage relay for controlling the actuation of the primary oil circuit breaker. Such arrangements require not only the primary oil circuit breaker, but also a transformer for use in connection with the time switch or voltage relay.

The general object of our invention is the provision of a relatively simple and economical means of effecting the alternate connection and disconnection of a group of capacitors in accordance with the normal voltage variation of the connected circuit without the use of a switch equipment directly connected to the primary conductors. Another object is the elimination of the necessity for a transformer and associated low voltage control equipment by employing one of the capacitors of the bank as a source of control energy. Both of the above-mentioned objects are best accomplished in connection with a system embodying a grounded neutral, through the disposition, in accordance with our invention, of the control element and switch on the normally grounded side of the capacitors. The manner in which these and other objects of our invention are accomplished will appear more in detail in the description to follow.

The single figure of the accompanying drawing illustrates diagrammatically an embodiment of our invention applied to a three-phase, four-wire alternating current circuit provided with a solidly grounded neutral. In practice, a single phase capacitor installation is seldom economically justified, however, our invention may be applied to a single phase circuit, as will be apparent hereinafter.

As illustrated, the system comprises the three phase conductors, 56, 57 and 58, which are connected to the Y-connected windings 10, 11 and 12 of a power transformer. The windings 10, 11 and 12 provide a neutral 17, which is preferably grounded, and the grounded-neutral conductor 55 extended. The power transformer is assumed to have a delta winding, not shown, and it is obvious that the neutral might be otherwise provided, for example, through a zig-zag connection or a Y-delta grounding bank.

A three-phase capacitor bank is shown connected to the phase conductors, the group of capacitors 18, 19, 20 and 21 being connected to the phase conductor 56 by the tap conductor 13, the group of capacitors 22, 23, 24 and 25 connected to the phase conductor 57 through the tap conductor 14, and the group of capacitors 26, 27, 28 and 29 connected to the phase conductor 58 through the tap conductor 15.

One or more of the capacitors of one of the phase groups is selected to provide energy at all times for controlling the operation of the remaining capacitors, such a controlling unit being continuously connected to the grounded-neutral conductor 55 in series-circuit relation with the operating coil 31 of the current-responsive device 60. Preferably the amount of capacitance continuously in the control circuit is small in comparison to the capacitance of the remaining or controlled capacitors. As shown, the capacitor 18 is the controlling capacitor of the system, and the remainder of the capacitors, 19, 20, 21, 22, 23, 24, 25, 26, 27, 28 and 29, are the controlled capacitors.

The current-responsive device 60 includes the over-balanced beam of conducting material 32, arranged for movement about the pivot 51, and having at its respective ends the first separable contacts 34 and 36, and the second separable contacts 33 and 35. The contacts 33 and 36 are pivotally mounted for limited movement, so that the contacts at any one end of the beam close before the contacts at the other end open, for the purpose of maintaining during operation a continuous connection of the capacitor 18 and the operating coil 31 between the phase conductor 56 and the grounded-neutral conductor 55, and thereby avoid the arcing which would otherwise attend the breaking of the charging current. At one end of the beam, an armature 50 is magnetically related to the operating coil 31, and when the current traversing the capacitor 18 and the coil 31 exceeds a predetermined amount, the armature end of the beam is picked up, resulting in the closing of the contacts 34—36 and the subsequent opening of the contacts 33—35. Similarly, when the current traversing the capacitor 18 is less than the predetermined pick-up current, the contacts 33—35 close and 34—36 open, in the order stated. An over-center spring 59 is employed to provide definite action and to limit hunting.

The positions in which the movable parts are shown correspond to a normal voltage condition of the connected circuit which requires the connection of the control capacitors to boost voltage. This connection is through the conductors 37, 38 and 39, the closed switch 46, and the conductors 40, 41 and 42 to the neutral conductor 16. In this situation, the controlling capacitor 18 is connected serially on the grounded side to the neutral conductor 16 by means of the conductor 30, the operating coil 31 of the current-responsive device, the second separable contacts 33—35, the conductor 45, the normally closed auxiliary switch 53, and the conductor 48.

Upon the occurrence of an excess-voltage on the connected circuit, such as might be caused by disconnection of load, the increase in voltage is accompanied by a corresponding increase in current through the controlling capacitor 18 and the control coil 31. When the current attains a predetermined value, the current-responsive device operates to close the contacts 34—36, and subsequently open the contacts 33—35. In response to this occurrence, the trip coil 43 is energized to trip the switch 46 to the open position, thereby disconnecting the controlled capacitors and correspondingly reducing the circuit voltage. After this occurs, the controlling capacitor 18 remains connected between the phase conductor 56 and the neutral 16 serial through the control coil 31, the contacts 34—36, the conductor 44, the normally open but now closed auxiliary switch switch 52 and the conductors 49. The opening of the switch 46 is accompanied by the opening of the auxiliary switch 53, removing the shunt from the operating coil 47, and establishing the latter in series with the now open contacts 33—35. Concurrent with a decrease in voltage on the connected circuit, the current traversing the coil 31 becomes too small to maintain the contacts 33—35 open; they therefore close, energizing the operating coil 47 of the switch 46, and reconnecting the controlled capacitors to the circuit.

From the above description, it will be seen that the connection and disconnection of the controlled capacitors is controlled in accordance with respective occurrence of a current through the controlling capacitor which is less than and exceeds a predetermined amount, and that this current is a linear function of the circuit voltage, since the frequency of the system is substantially constant.

It may be noted that our invention contemplates the connection of all controlling apparatus on the grounded side of the capacitors. This feature has the very practical advantage of requiring insulation on only one side of the switch. A switch interposed between the capacitors and the phase conductors requires line insulation for six conductors. In accordance with our invention, only four leads are required, one of which (30) is always at substantially ground potential. A further advantage resides in the fact that insulation failure would result only in the connection of the controlled capacitors, and would not cause the circuit outage which would attend insulation failure between the capacitors and the phase conductors.

While we have illustrated and described our invention in considerable detail for the purpose of facilitating a clear understanding, it is intended that our presentation shall be regarded as illustrative rather than limiting, as we seek to cover in the appended claims all modifications which lie within the true spirit and scope of the invention.

We claim as our invention:

1. A control system for a polyphase alternating current circuit comprising a plurality of capacitors associated with each phase of said circuit, means continuously connecting only one of said capacitors to one phase conductor of said circuit, the capacitance of said one capacitor being small in comparison with the total capacitance of said capacitors, and switch means operative for alternately disconnecting and connecting all of the remaining capacitors when the current traversing said one of said capacitors respectively exceeds and is less than a predetermined quantity.

2. In a control system for a polyphase alternating current circuit comprising a group of capacitors associated with each phase of said circuit, means continuously connecting only one of said capacitors of one group to one phase conductor of said circuit, the capacitance of said one capacitor being small in comparison with the total capacitance of said capacitors, a switch having an open and a closed position and operative for respectively disconnecting and connecting all of the remaining capacitors, and means dependent upon the magnitude of the current traversing said one of said capacitors for establishing the position of said switch.

3. A control system for a polyphase alternating current circuit, comprising an equal number of capacitors associated with each phase of said circuit, current responsive means continuously in circuit connecting only one of said capacitors to one phase conductor of said circuit, the capacitance of the continuously connected capacitor being small in comparison with the total capacitance of said capacitors, switch means adapted for alternately disconnecting and connecting all of the remaining capacitors, said current-responsive means controlling the actuation of said switch means when the current traversing said one of said capacitors exceeds and is less than a predetermined quantity to respectively disconnect and connect all of the remaining capacitors.

4. A control system for a polyphase alternating current circuit, comprising an equal number of capacitors associated with each phase of said circuit, current-responsive means, means connecting said current-responsive means in series-circuit relation with only one of said capacitors to only one phase conductor of said circuit, the capacitance of said only one of said capacitors being small in comparison with the capacitance of all of the capacitors, and switch means controlled by said current-responsive means and operative for respectively disconnecting and connecting all of the remaining capacitors.

5. A control system for a polyphase alternating current circuit which includes an equal number of capacitors associated with each phase of said circuit, comprising means continuously connecting only one of said capacitors in one phase of said circuit, the capacitance of the continuously connected capacitor being small in comparison with the capacitance of all of the capacitors, a switch having an open and a closed position and adapted for respectively disconnecting and connecting the remainder of said capacitors, and means responsive, respectively, to the passage of a predetermined current through said one of said capacitors for disconnecting the remainder of said capacitors, and to the passage of a current less than said predetermined current through said one of said capacitors for connecting said remainder of said capacitors.

6. A control system for an alternating current polyphase circuit, comprising a plurality of capacitors of equal number associated with each phase conductor of said circuit, said capacitors consisting of a controlling capacitor and controlled capacitors, said controlling capacitor having a capacitance relatively small with respect to that of said controlled capacitors, means including a switch having an open and a closed position for normally connecting said equal number of said capacitors to each phase of said circuit, current-responsive means, means connecting said controlling capacitor permanently in series-circuit relation with said current-responsive means to only one phase conductor of said circuit, and means controlled by said current-responsive means for actuating said switch to the open position to disconnect all of the controlled capacitors when the current traversing said current-responsive means exceeds a predetermined amount.

7. A control system for an alternating current circuit having at least one phase conductor and one grounded-neutral conductor, comprising a plurality of capacitors consisting of a controlling capacitor and controlled capacitors, a switch movable between open and closed positions, current-responsive means embodying first separable contacts and second separable contacts and constructed and arranged so that said first contacts close and said second contacts open when the current traversing said current-responsive means exceeds a predetermined amount and so that said second contacts close and said first contacts open when said current is less than said predetermined amount, means continuously connecting said controlling capacitor between said phase conductor and said grounded-neutral conductor, said current-responsive means being interposed in series-circuit relation between said controlling capacitor and said grounded-neutral conductor, means including said switch for connecting said controlled capacitors between said phase conductor and said grounded-neutral conductor, said switch being interposed between said controlled capacitors and said grounded-neutral conductor, and means responsive to closing of said first separable contacts and accompanying opening of said second separable contacts for actuating said switch to open position and to the closing of said second separable contacts and accompanying opening of said first separable contacts for actuating said switch to the closed position.

8. A control system for an alternating current circuit having at least one phase conductor and one grounded-neutral conductor, comprising a plurality of capacitors consisting of a controlling capacitor and controlled capacitors, a switch movable between open and closed positions, current-responsive means embodying first separable contacts and second separable contacts and so constructed and arranged that said first contacts close and said second contacts subsequently open when the current traversing said current-responsive means exceeds a predetermined amount and that said second contacts close and said first contacts subsequently open when said current is less than said predetermined amount, means including said current-responsive means for continuously connecting said controlling capacitor between said phase conductor and said grounded-neutral conductor, said current-responsive means being interposed in series-circuit relation between said controlling capacitor and said grounded-neutral conductor, means including said switch for connecting and disconnecting said controlled capacitors between said phase conductor and said grounded-neutral conductor, said switch being interposed between said controlled capacitors and said grounded-neutral conductor, and means responsive to closing of said first separable contacts and accompanying subsequent opening of said second separable contacts for actuating said switch to open position and to the closing of said second separable contacts and accompanying subsequent opening of said first separable contacts for actuating said switch to the closed position.

9. A control system for a polyphase alternating current circuit having a grounded-neutral conductor, comprising a plurality of capacitors consisting of a controlling capacitor and controlled capacitors, a switch movable between open and closed positions, current-responsive means embodying first separable contacts and second separable contacts and so constructed and arranged that said first contacts close and said second contacts subsequently open when the current traversing said current-responsive means exceeds a predetermined amount and that said second contacts close and said first contacts subsequently open when said current is less than said predetermined amount, means including said current-responsive means for continuously connecting said controlling capacitor between only one phase conductor and said grounded-neutral conductor, said current-responsive means being interposed in series-circuit relation between said controlling capacitor and said grounded-neutral conductor, means including said switch for connecting and disconnecting certain of said controlled capacitors between each phase conductor and said grounded-neutral conductor, said switch being interposed between said controlled capacitors and said grounded-neutral conductor, and means responsive to closing of said first separable contacts and accompanying subsequent opening of said second separable contacts for actuating said switch to open position and to the closing of said second separable contacts and accompanying subsequent opening of said first separable contacts for actuating said switch to the closed position.

RALPH R. PITTMAN.
PAUL G. WHITMORE.

REFERENCES CITED

The following references are of record in the file of this patent:

UNITED STATES PATENTS

| Number | Name | Date |
| --- | --- | --- |
| 2,078,667 | Kado | Apr. 27, 1937 |
| 2,295,388 | Cuttino | Sept. 8, 1942 |
| 2,298,026 | Bany | Oct. 6, 1942 |
| 2,313,950 | Langguth | Mar. 16, 1943 |